April 21, 1959
W. R. POLANIN
2,883,006
TREAD BRAKE ARRANGEMENT
Filed Oct. 24, 1955
2 Sheets-Sheet 1
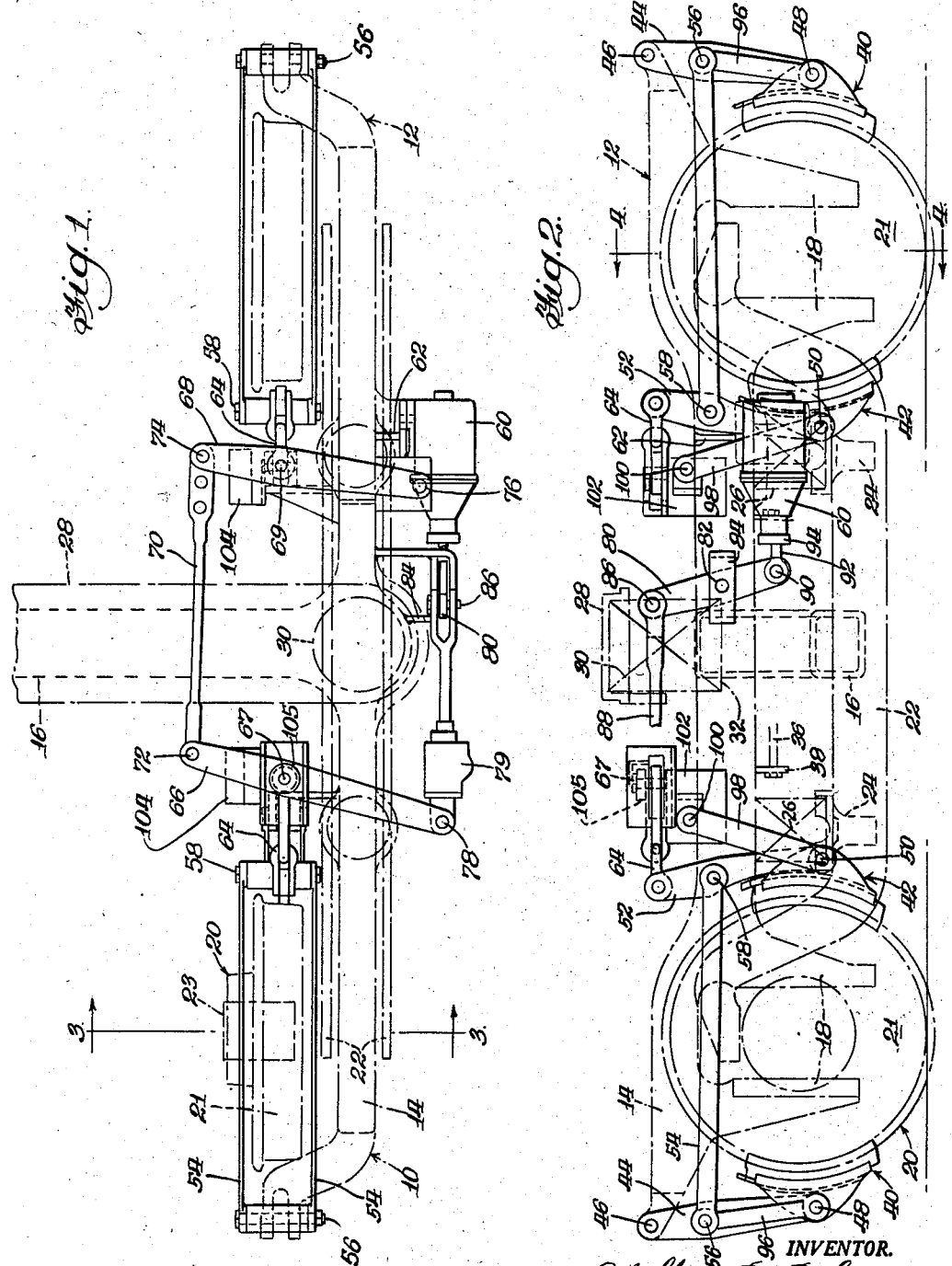
INVENTOR.
Walter R. Polanin
BY Walter L. Schlegel, Jr.
Atty.

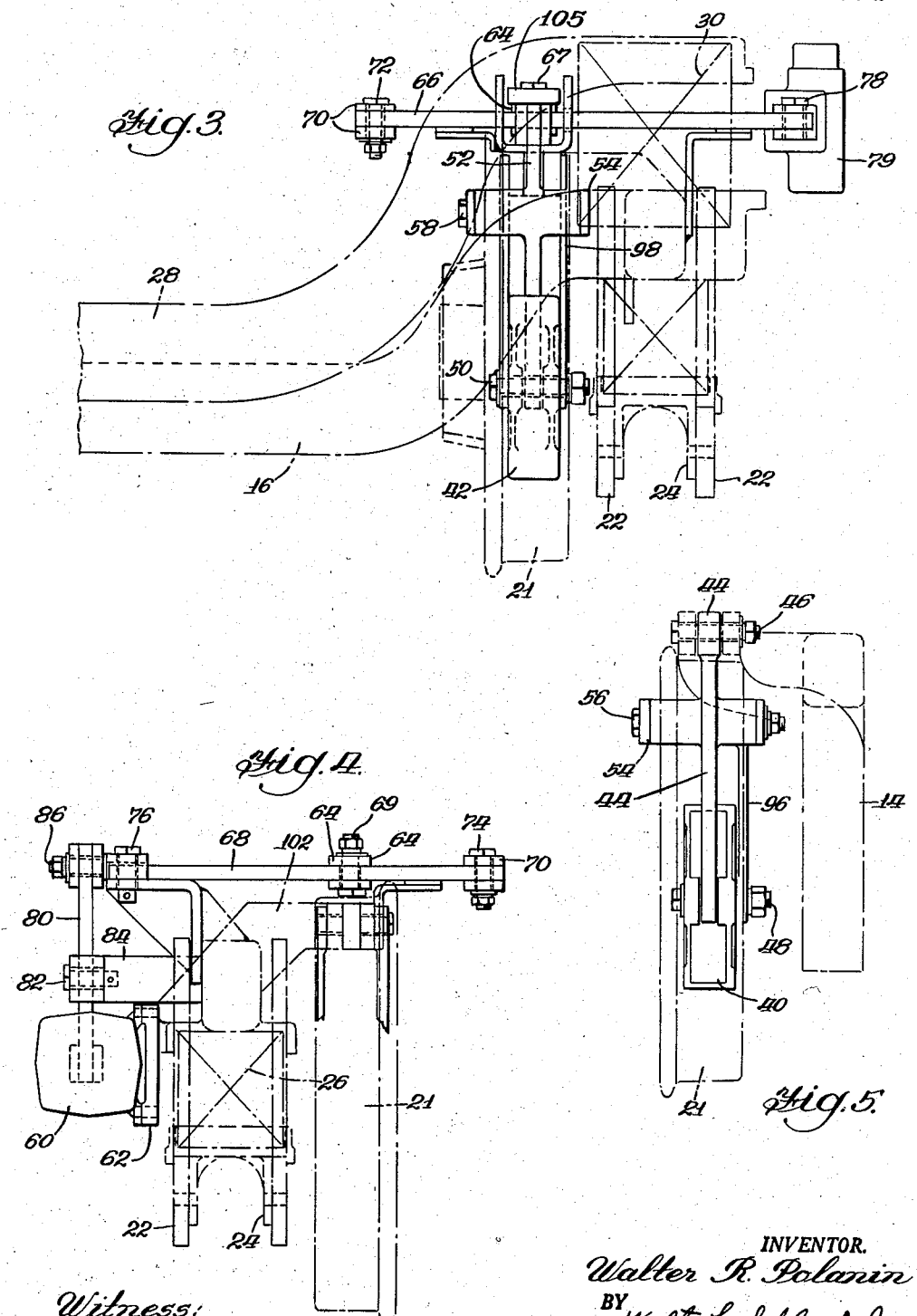

2,883,006
TREAD BRAKE ARRANGEMENT

Walter R. Polanin, Chicago, Ill., assignor to American Steel Foundries, Chicago, Ill., a corporation of New Jersey Application October 24, 1955, Serial No. 542,401

1 Claim. (Cl. 188—56)

This invention relates to railway car brake arrangements and more particularly to that type of brake arrangement known in the art as a tread or clasp brake arrangement.

The invention comprehends a novel brake linkage, interconnecting the brake shoe assemblies with the power source, in a railway car truck.

A primary object of this invention is the provision of a highly compact and efficient brake linkage adapted for use in a high speed light weight railway car truck.

Another object of the invention is to provide a linkage arrangement wherein the power cylinder and slack adjusting device can be positioned intermediate their respective wheel and axle assemblies.

Another object of the invention is the provision of a linkage arrangement wherein the actuating levers are interconnected at their inboard extremities by a pull rod.

A further object is the provision of an arrangement which includes an operating or power control lever connecting the power means to the linkage.

These and other objects will be apparent from an examination of the drawings and description, wherein:

Figure 1 is a fragmentary plan view of a railway car truck embodying my invention, only one side of the truck being shown as the opposite side may be symmetrical about the vertical center plane of the truck;

Figure 2 is a side elevational view of the structure illustrated in Figure 1;

Figure 3 is a fragmentary end elevational view of the structure illustrated in Figure 1 as seen from line 3—3 of Figure 1;

Figure 4 is a fragmentary end elevational view of the structure illustrated in Figure 2 as seen by the line 4—4 of Figure 2, and Figure 5 is a fragmentary end elevational view of the structure illustrated in Figure 2 as seen from the left.

It will be noted that certain elements have been intentionally omitted from certain views where they are illustrated to better advantage in other views.

Referring now to the drawings for a better understanding of the invention, it will be seen that the railway car truck indicated generally at 10 comprises a generally H-shaped frame 12 having spaced side members or wheel pieces 14 (only one of which is shown) interconnected by a transverse member or transom 16 which is preferably formed integrally with the side members.

The side member 14 is of the pedestal type having depending jaws 18, adjacent each end thereof, adapted to receive in the usual manner, journal means (not shown) which house wheel and axle assemblies 20.

The journal means of the truck may be connected by equalizer bars 22 having spring seats 24 on which are mounted frame supporting springs 26.

The car body (not shown) may be mounted in the usual manner on a bolster 28 supported at either end by springs 30 seated on the side members at 32.

To resist or limit movement of the bolster transversely of the truck, the bolster may be anchored to the side frame in any desired manner (not shown).

Outer and inner brake shoe assemblies 40 and 42, respectively, are positioned adjacent each wheel 21 for frictional engagement therewith. The outer brake shoe assemblies are supported by dead outer brake levers 44, fulcrumed at their upper extremities to the side members by pins 46 and pivoted to the brake shoe assemblies by pins 48. The inner brake shoe assemblies are pivoted by pins 50 to the lower extremities of live inner brake levers 52. The inner and outer levers associated with each wheel may be interconnected by straps 54 which are disposed above the axle 23 in order to facilitate rapid removal of the wheel and axle assembly from the truck without removal of the brake equipment. Straps 54 may be pivoted to the outer and inner levers by pins 56 and 58, respectively, intermediate the ends of the brake levers.

A power cylinder 60 may be mounted on the outboard side of the side member by means of a bracket 62 and positioned between the respective wheel and axle assemblies.

The upper ends of the inner brake levers may be provided with clevises 64 which in turn are connected to left and right (as seen in Figure 1) actuating levers 66 and 68 by pins 67 and 69, respectively. The inboard ends of the actuating levers may be interconnected by a pull rod 70 pivoted to the left and right levers by pins 72 and 74, respectively. The right hand actuating lever is a dead lever having its outboard extremity fulcrumed to the frame by pin 76, while the left hand actuating lever is a live lever, having its outboard extremity pivotally connected by pin 78 to a slack adjusting device 79 operable to shorten the distance between interconnected elements and thereby take up slack in the linkage caused by wear of parts.

The slack adjusting device and power cylinder, as best seen in Figure 2, are interconnected by a dead power control lever 80 fulcrumed intermediate its ends by pin 82 to a side member bracket 84, the upper end of the lever being pivoted by pin 86 to extension rod 88 of the slack adjusting device 79 and the lower end of the lever being pivoted by pin 90 to extension rod 92 of power cylinder piston 94. Thus it will be apparent that since one end of the slack adjusting device is connected to lever 66 and the other end of the slack adjusting device is connected to lever 80, the position of the slack adjuster device is floating or movable relative to the truck frame and the power cylinder.

Additional safety support for each lever is afforded by outer and inner brake hangers 96 and 98. The outer brake hangers have their upper ends pivoted to the related brake lever and strap by pin 56 and their lower ends pivoted to the brake shoe assemblies by pin 48. The inner brake hangers are pivoted at their lower ends to the brake shoe assemblies by pins 50 and have their upper ends pivoted by pins 100 to side frame hanger brackets 102. The brackets 102 may be provided with inwardly extending shelves 104 which offer additional support for the horizontal actuating levers.

To describe the operation of the invention and referring again to Figure 2, it will be understood that as the power cylinder piston moves forward or to the left, it causes the power control lever 80 to rotate clockwise about pin 82 moving the slack adjusting device 79 to the right. This in turn causes the left hand actuating lever 66 to rotate counterclockwise about pin 72 urging the left hand inner brake lever to rotate clockwise about pin 58 to bring the inner brake shoe assembly into engagement with the wheel. As the assembly engages the wheel, the brake lever continues to rotate clockwise, moving the left hand strap and outer brake lever to the right to bring the outer brake shoe assembly into engagement with the wheel.

At this time the point of the left hand actuating lever shifts to pin 67 and the lever continues to rotate counterclockwise urging the pull rod 70 to the left, as seen in Figure 1 and causes the right hand actuating lever 68 to rotate counterclockwise about pin 76. By this action the right hand inner brake lever 52 is urged to rotate counterclockwise, as seen in Figure 2, about pin 58 to bring the related brake shoe assembly into engagement with the wheel. As the brake shoe assembly engages the wheel, lever 52 continues to rotate counterclockwise urging the right hand actuating lever to the right to bring the outer brake shoe assembly into engagement with the wheel. It is to be understood, of course, that all of this motion takes place at substantially the same time.

In order to provide low friction lateral guiding means for actuating lever 66, a steel roller 105 may be interposed between the head of pin 67 and the clevis 64.

Inasmuch as the pull rod 70 interconnects the inboard ends of the actuating levers, the power cylinder and slack adjusting device may be placed immediately adjacent each other intermediate the wheel and axle assemblies thus affording a compact and efficient arrangement.

It will be understood that with the novel power control lever 80, the power ratio of the power cylinder may be controlled to multiply or decrease the brake power as desired simply by the relative positioning of the fulcrum point pin of the power control lever.

I claim:

In a brake arrangement for a railway car truck having a frame and a pair of supporting wheel and axle assemblies, the combination of: friction means engageable with surfaces presented by respective assemblies, said friction means being disposed on the inner sides of the assemblies adjacent each other; a power cylinder mounted on the outboard side of the frame in substantial alignment, transversely of the truck, with one of said friction means; a slack adjusting device disposed on the outboard side of the frame in substantial alignment, transversely of the truck, with the other friction means; a pair of generally vertical brake levers pivotally connected at their lower ends to the respective friction means; means to fulcrum the brake levers intermediate their ends; a pair of generally horizontal actuating levers connected intermediate their ends to the respective brake levers, one of said actuating levers being a dead lever fulcrumed at its outboard end to the frame at a point located closely adjacent the power cylinder, the other of said actuating levers being a live lever pivotally connected at its outboard end to the slack adjusting device; a pull rod interconnecting the inboard ends of the actuating levers; and a generally vertical dead cylinder lever fulcrumed intermediate its ends to the outboard side of the frame and pivotally connected at its upper end and lower ends to the slack adjusting device and power cylinder, respectively.

References Cited in the file of this patent

UNITED STATES PATENTS

| | | |
|---|---|---|
| 1,681,058 | Sauvage | Aug. 14, 1928 |
| 2,071,963 | Baselt | Feb. 23, 1937 |
| 2,166,887 | Aurien | July 18, 1939 |
| 2,280,754 | Flesch | Apr. 21, 1942 |